(12) United States Patent
Li et al.

(10) Patent No.: US 9,880,433 B2
(45) Date of Patent: Jan. 30, 2018

(54) COLOR FILTER SUBSTRATE AND DISPLAY DEVICE

(71) Applicants: BOE TECHNOLOGY GROUP CO., LTD., Beijing (CN); Chongqing BOE Optoelectronics Technology CO., Ltd., Chongqing (CN)

(72) Inventors: Zhe Li, Beijing (CN); Fei Shang, Beijing (CN); Haijun Qiu, Beijing (CN)

(73) Assignees: BOE TECHNOLOGY GROUP CO., LTD., Beijing (CN); Chongqing BOE Optoelectronics Technology Co., Ltd., Chongqing (CN)

( * ) Notice: Subject to any disclaimer, the term of this patent is extended or adjusted under 35 U.S.C. 154(b) by 26 days.

(21) Appl. No.: 14/742,081

(22) Filed: Jun. 17, 2015

(65) Prior Publication Data

US 2016/0146991 A1    May 26, 2016

(30) Foreign Application Priority Data

Nov. 26, 2014    (CN) .......................... 2014 1 0698816

(51) Int. Cl.
  *G02B 5/22*   (2006.01)
  *G02F 1/1333*   (2006.01)
  (Continued)

(52) U.S. Cl.
  CPC .. *G02F 1/136204* (2013.01); *G02F 1/133512* (2013.01); *G02F 1/133514* (2013.01)

(58) Field of Classification Search
  CPC ......... G02F 1/133509; G02F 1/133512; G02F 1/133514; G02F 1/133388;
  (Continued)

(56) References Cited

U.S. PATENT DOCUMENTS 5,739,880 A * 4/1998 Suzuki .............. G02F 1/133512
                                               349/110
6,498,672 B2 * 12/2002 Saitoh ............... G02F 1/133308
                                               349/149

(Continued)

FOREIGN PATENT DOCUMENTS

CN       102135675 A     7/2011
CN       202583650 U    12/2012
(Continued)

*Primary Examiner* — Thomas K Pham
*Assistant Examiner* — Nicholas R Pasko
(74) *Attorney, Agent, or Firm* — Kinney & Lange, P.A.

(57) ABSTRACT

A color filter substrate is provided. The color filter substrate includes an underlying substrate, a first light-shielding structure, a second light-shielding structure and an electrical conductive transparent layer configured for transferring electrostatic charge An outer edge of the first light-shielding structure is spaced apart by a first distance from an outer edge of the non-displaying portion of the underlying substrate. A vertical projection of a non-displaying portion of the underlying substrate on a first plane is entirely covered by a combination of a vertical projection of the first light-shielding structure on the first plane and a vertical projection of the second light-shielding structure on the first plane, the first plane being a plane perpendicular to a propagation direction of light emitted toward the non-displaying region of the color filter substrate.

12 Claims, 2 Drawing Sheets

(51) Int. Cl.
*G02F 1/1362* (2006.01)
*G02F 1/1335* (2006.01)

(58) Field of Classification Search
CPC ........... G02F 1/136209; G02F 1/13338; G02F 2001/133388; G02F 2001/13332
USPC ........... 348/842; 349/104, 106, 110, 58, 111; 359/491.01, 609
See application file for complete search history.

(56) References Cited

U.S. PATENT DOCUMENTS

| | | | | |
|---|---|---|---|---|
| 6,654,083 | B1 * | 11/2003 | Toda | G02F 1/133308 349/110 |
| 6,900,867 | B2 * | 5/2005 | Lee | G02F 1/134363 349/106 |
| 7,719,745 | B2 * | 5/2010 | Yamada | G02F 1/133502 257/59 |
| 7,808,586 | B2 * | 10/2010 | Mochizuki | G02F 1/133512 349/110 |
| 7,808,587 | B2 * | 10/2010 | Shirasaka | H04N 9/3167 349/110 |
| 8,089,587 | B2 * | 1/2012 | Iida | G02F 1/133512 349/110 |
| 8,558,972 | B2 * | 10/2013 | Asaoka | G02F 1/133512 349/104 |
| 2002/0008824 | A1 | 1/2002 | Son et al. | |
| 2006/0001823 | A1 * | 1/2006 | Shih | G02F 1/133512 349/153 |
| 2008/0094562 | A1 | 4/2008 | Lee et al. | |
| 2012/0062486 | A1 * | 3/2012 | Rho | G06F 3/041 345/173 |
| 2013/0113695 | A1 * | 5/2013 | Tseng | G02F 1/13338 345/92 |
| 2014/0176853 | A1 * | 6/2014 | Wang | G02F 1/133308 349/58 |

FOREIGN PATENT DOCUMENTS

| | | | | |
|---|---|---|---|---|
| CN | 103048827 A | * | 4/2013 | ....... G02F 1/133308 |
| JP | 2011170134 A | | 9/2011 | |
| KR | 20110055935 A | | 5/2011 | |

* cited by examiner

COLOR FILTER SUBSTRATE AND DISPLAY DEVICE

CROSS-REFERENCE TO RELATED APPLICATION

This application claims the benefits of Chinese Patent Application No. 201410698816.6 filed on Nov. 26, 2014 in the State Intellectual Property Office of China, whole disclosure of which is incorporated herein by reference.

BACKGROUND OF THE INVENTION

Field of the Invention

The present invention relates to the technical field of display technology, and specifically, relates to a color filter substrate and a display device.

Description of the Related Art

FIG. 1 shows a display device in prior arts. As shown in FIG. 1, the display device comprises a frame 1, a color filter substrate 2, an array substrate 3, and a backlight module (not shown), which are disposed successively. The display device comprises a displaying region A and a non-displaying region B, and in FIG. 1, the left side of the dashed line O-O' is the displaying region A, and the right side of the dashed line O-O' is the non-displaying region B. The non-display region B of the color filter substrate 2 is provided with a black matrix 4, which is used to prevent a leakage of light from edges of the display device.

However, the black matrix 4 only covers a part of the non-displaying region B of the color filter substrate 2, and the edges of the non-displaying region B are left uncovered. Therefore, when light L from the backlight module is reflected at the frame 1, the light will pass through a part of the non-displaying region B of the color filter substrate 2 uncovered by the black matrix, then exits the display device at a position near the frame 1, so that a light leakage phenomenon at periphery of the display device occurs.

In order to avoid the light leakage phenomenon at the periphery, there is provided another display device in the prior art. As shown in FIG. 2, a range covered by the black matrix 4 is enlarged, such that an edge of the black matrix 4 aligns with an edge of the non-displaying region B of the color filter substrate 2, and light L cannot pass through the non-displaying region B of the color filter substrate 2 and cannot exit the display device. Moreover, in order to prevent the display device from generating static electricity, the color filter substrate 2 is also provided with a transparent static electricity transmission layer 5, and a silver gluing spot 6 is provided at an edge of the color filter substrate 2 so that the silver gluing spot 6 connects the static electricity transmission layer 5 to a ground point 7 on the array substrate 3, and thereby the static electricity is eliminated.

The inventor finds out that, since the edge of the black matrix 4 is aligned with the edge of the color filter substrate 2, the static electricity in the silver gluing spot 6 is transmitted to the black matrix 4, electrical field in the displaying region A is thereby affected, such that a bad picture is displayed in the display device.

SUMMARY OF THE INVENTION

The present invention has been made to overcome or alleviate at least one aspect of the above mentioned disadvantages.

Accordingly, it is an object of the present invention to provide a color filter substrate and a display device comprising the color filter substrate.

According to an aspect of the present invention, there is provided a color filter substrate. In an exemplary embodiment, the color filter substrate comprises an underlying substrate, a first light-shielding structure disposed on a first surface of the underlying substrate, and a static electricity transmission layer disposed on a second surface of the underlying substrate opposite to the first surface. The color filter substrate is divided into a displaying region and a non-displaying region, and the underlying substrate comprising a displaying portion located in the displaying region and a non-displaying portion located in the non-displaying region. An outer edge of the first light-shielding structure is spaced apart by a first distance from an outer edge of the non-displaying portion of the underlying substrate; the color filter substrate further comprises a second light-shielding structure located in the non-displaying region and between the underlying substrate and the static electricity transmission layer, the second light-shielding structure extending inward from the outer edge of the non-displaying portion of the underlying substrate; and a vertical projection of the non-displaying portion of the underlying substrate on a first plane is entirely covered by a combination of a vertical projection of the first light-shielding structure on the first plane and a vertical projection of the second light-shielding structure on the first plane, the first plane being a plane perpendicular to a propagation direction of light emitted toward the non-displaying region of the color filter substrate.

According to another aspect of the present invention, there is provided a display device comprising the above color filter substrate.

BRIEF DESCRIPTION OF THE DRAWINGS

In order to even more clearly describe the technical solutions according to embodiments of the invention and the technical solutions according to the prior art, the drawings used to illustrate the embodiments and the prior art are briefly introduced as follows. Obviously, the following drawings show only some of the embodiments of the present invention, and for those skilled in the art, other embodiments can be obtained based on the drawings without any inventive step.

DETAILED DESCRIPTION OF PREFERRED EMBODIMENTS OF THE INVENTION

Figure 1:
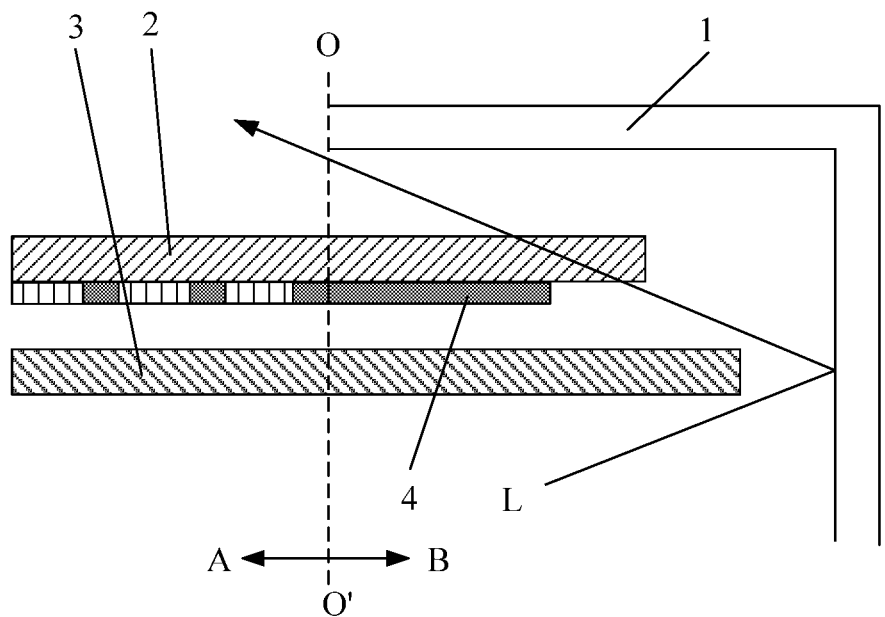
FIG. 1 is a sectional view of a part of a display device in the prior art, which schematically shows a light leakage phenomenon at periphery of the display device.
Figure 2:
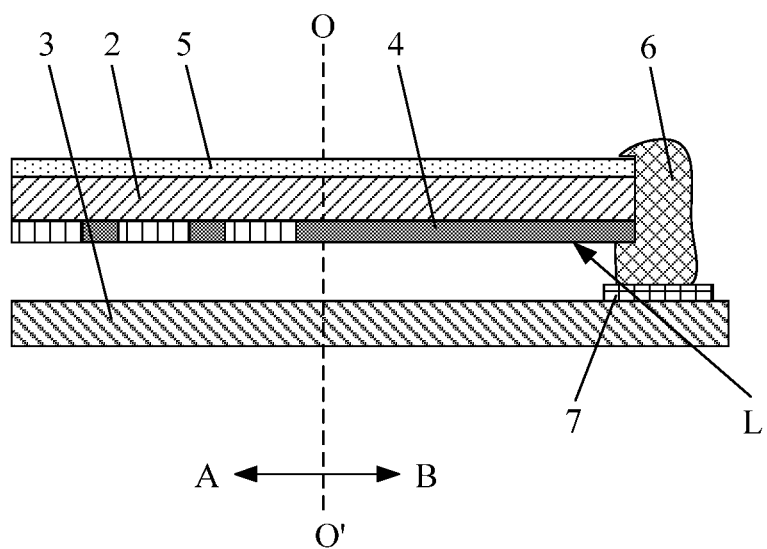
FIG. 2 is a partial sectional view of a display device in the prior art, which shows a design avoiding peripheral light leakage.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein;

rather, these embodiments are provided so that the present disclosure will be thorough and complete, and will fully convey the concept of the disclosure to those skilled in the art.

It is to be noted that, the terms concerning orientations in this specification only intends to facilitate describing the drawings, and do not intend to limit the present invention thereto.

Figure 3:
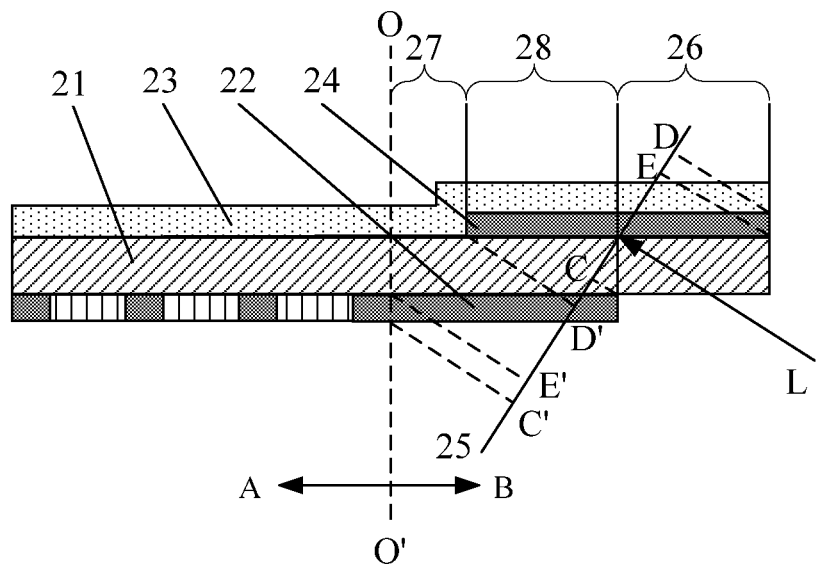
FIG. 3 is a schematic partial sectional view of a display device according to an exemplary embodiment of the present invention.

An embodiment of the present invention provides a color filter substrate. As shown in FIG. 3, the color filter substrate comprises an underlying substrate 21, a first light-shielding structure 22 disposed on a lower surface of the underlying substrate 21, and a static electricity transmission layer 23 disposed on an upper surface of the underlying substrate 21. The color filter substrate is divided into a displaying region A and a non-displaying region B. Correspondingly, the underlying substrate 21 comprises a displaying portion located in the displaying region A and a non-displaying portion located in the non-displaying region B. An outer edge (e.g., right edge, in the figure) of the first light-shielding structure 22 is spaced apart by a first distance 26 from an outer edge of the non-displaying portion of the underlying substrate 21.

The color filter substrate further comprises a second light-shielding structure 24 located in the non-displaying region B and between the underlying substrate 21 and the static electricity transmission layer 23, and the second light-shielding structure 24 extends inward from the outer edge of the non-displaying portion of the underlying substrate 21.

A vertical projection EE' of the portion of the underlying substrate 21 in the non-displaying region B projected on a first plane 25 is entirely covered by a combination of a vertical projection CC' of the first light-shielding structure 22 projected on the first plane 25 and a vertical projection DD' of the second light-shielding structure 24 projected on the first plane 25, wherein the first plane 25 is a plane perpendicular to a propagation direction of light L emitted toward the non-displaying region B of the color filter substrate.

Moreover, in order to help those skilled in the art to fully understand the present invention, specific structures of color filter substrates according to two preferred embodiments of the present invention will be described in conjunction with the attached drawings. The color filter substrate according to the first embodiment differs from the color filter substrate according to the second embodiment only in that: respective covering regions of the first light-shielding structure 22 and the second light-shielding structure 24 are different in the two embodiments.

The First Embodiment

As shown in FIG. 3, the second light-shielding structure 24 does not extend to the interface OO' between the displaying region A and the non-displaying region B, and the second light-shielding structure 24 is spaced apart by a second distance 27 from the interface OO' between the displaying region A and the non-displaying region B. In this circumstance, in order to prevent light from passing through a region that is not covered by the second light-shielding structure 24, the first light-shielding structure 22 should extend from the displaying region A to the non-displaying region B, and a vertical projection of the first light-shielding structure 22 on the underlying substrate 21 has an overlapped region 28 with a vertical projection of the second light-shielding structure 24 on the underlying substrate 21. Since there is the overlapped region 28 between the first light-shielding structure 22 and the second light-shielding structure 24, light L cannot pass through the non-displaying portion of the underlying substrate 21, and in turn, the light L cannot pass through the non-displaying region B of the color filter substrate. With such a configuration, there's no need to exactly determine the positions to which the first light-shielding structure and the second light-shielding structure extend, such that the difficulty in manufacturing the first light-shielding structure 22 and the second light-shielding structure 24 is decreased.

In a preferable example, a width of the overlapped region 28 is larger than or equal to 0.8 mm. An upper threshold of the width of the overlapped region 28 can be determined by one skilled in the art according to practical requirements. Generally, light-shielding performance achieved by the cooperation of the first light-shielding structure 22 and the second light-shielding structure 24 is better if the width is larger.

The Second Embodiment

Figure 4:
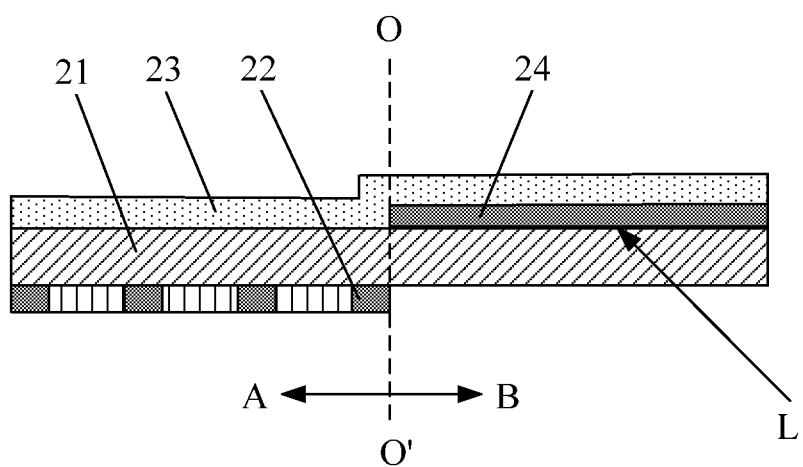
FIG. 4 is a schematic partial sectional view of a display device according to another exemplary embodiment of the present invention.

As shown in FIG. 4, the second light-shielding structure 24 extends inward from the outer edge of the non-displaying portion of the underlying substrate to the interface OO' between the displaying region A and the non-displaying region B. In this circumstance, since a thickness of the underlying substrate 21 is very small, it is considered that the projection of the second light-shielding structure 22 on the first plane and the projection of the non-displaying portion of the underlying substrate 21 on the first plane are completely overlapped, or at least they are substantially overlapped. In an alternative embodiment, the second light-shielding structure 24 may also be extended slightly beyond the interface OO' between the displaying region A and the non-displaying region B, if such a configuration will not affect the display of the displaying region. With such a configuration, the second light-shielding structure 24 completely covers the non-displaying portion of the underlying substrate, and therefore, the second light-shielding structure 24 alone can completely shield the light L emitted to the non-displaying region B of the color filter substrate. Moreover, since the second light-shielding structure 24 does not have to extend exactly to the interface OO' between the displaying region A and the non-displaying region B, the difficulty in manufacturing the second light-shielding structure 24 is decreased.

When the light-shielding structure 24 extends inward from the edge of the underlying substrate 21 to the interface OO' between the displaying region A and the non-displaying region B, the first light-shielding structure 22 may be only disposed within the displaying region A, as shown in FIG. 4; or, the first light-shielding structure 22 may also extend slightly into the non-displaying region B. Since the region covered by the first light-shielding structure 22 does not need to be exactly controlled, the difficulty in manufacturing the first light-shielding structure 22 is decreased.

After assembling the color filter substrate with an array substrate, silver glue is applied at edges of the color filter substrate so as to provide silver gluing spots. The silver gluing spots connects the static electricity transmission layer 23 to a ground point disposed on the array substrate, so as to prevent the display device from generating static electricity. During the process of applying the silver glue, the silver glue will extend to a region inside the edge of the underlying substrate, because the silver glue has a flow property to some extent. To ensure that the first light-shielding structure 22 does not contact the silver glue spots, preferably, the first distance 26 is larger than or equal to 0.2 mm.

It is to be noted that, the color filter substrate provided according to embodiments of the present invention further comprises pixels. Exemplarily, each pixel consists of a red subpixel, a green subpixel, and a blue subpixel. Each of the subpixels only allows light having a certain color passing therethrough, such that the display device can achieve a color display.

Furthermore, in order to simply the manufacturing process of the color filter substrate, a material for the first light-shielding structure 22 is the same as that for the second light-shielding structure 24. Still further, preferably, the first light-shielding structure 22 in the embodiments of the present invention is a black matrix. In this circumstance, the first light-shielding structure 22 in the displaying region A is located between adjacent pixels or adjacent subpixels, and corresponds to the positions of a gate line, a data line, and a thin film transistor (TFT), so that the first light-shielding structure 22 can shield the gate line, the data line, and the TFT, and can also prevent a light leakage from occurring at an interval between adjacent subpixels.

According to another aspect of the present invention, an exemplary embodiment of the present invention provides a display device comprising the color filter substrate as described above. The display device may be a liquid crystal panel, an e-book, a Mobil phone, a tablet, a TV set, a display screen, a notebook computer, a digital frame, a navigator, or other products or components having a display function. Other components of the display device are known in this technical field, which will not be described in detail. As an example, the display device may also comprise a backlight module, an array substrate, a liquid crystal molecule layer. The backlight module, the array substrate, the liquid crystal molecule layer, and the color filter substrate are disposed successively.

In the display device according to the embodiment of the present invention utilizing the color filter substrate as described in the above embodiments, since a combination of the vertical projection of the first light-shielding structure on the first plane and the vertical projection of the first light-shielding structure on the first plane completely cover the vertical projection of the non-displaying portion of the underlying substrate on the first plane, light emitted toward the non-displaying portion of the underlying substrate is completed shielded by the first and second light-shielding structures, such that the light cannot pass through the non-displaying portion of the underlying substrate, and in turn the light cannot pass through the non-display region of the color filter substrate and exit the display device, so that the peripheral light leakage of the display device can be avoided. Furthermore, since there is the first distance between the edge of the first light-shielding structure and the outer edge of the underlying substrate in the non-displaying region, the silver glue spots provided at edges of the underlying substrate of the color filter substrate of the display device cannot contact the first light-shielding structure. Therefore, the static electricity transferred to the silver glue spots from the static electricity transmission layer cannot be transferred to the first light-shielding structure, and thereby electrical fields in the display device are not affected.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A color filter substrate, comprising an underlying substrate, a first light-shielding structure disposed on a first surface of the underlying substrate, and an electrically conductive transparent layer configured for transferring electrostatic charge, the electrically conductive transparent layer being disposed on a second surface of the underlying substrate opposite to the first surface, the color filter substrate being divided into a displaying region and a non-displaying region, the underlying substrate comprising a displaying portion located in the displaying region and a non-displaying portion located in the non-displaying region, wherein
   an outer edge of the first light-shielding structure is spaced apart by a first distance from an outer edge of the non-displaying portion of the underlying substrate;
   the color filter substrate further comprises a second light-shielding structure located in the non-displaying region and between the underlying substrate and the electrically conductive transparent layer, an outer edge of the second light-shielding structure being aligned with the outer edge of the non-displaying portion of the underlying substrate;
   a vertical projection of the non-displaying portion of the underlying substrate on a first plane is entirely covered by a combination of a vertical projection of the first light-shielding structure on the first plane and a vertical projection of the second light-shielding structure on the first plane, the first plane being a plane perpendicular to a propagation direction of light emitted toward the non-displaying region of the color filter substrate; and
   an inner edge of the second light-shielding structure is spaced apart by a second distance from an interface between the non-displaying region and the displaying region, the first light-shielding structure is located in both the non-displaying region and in the displaying region, and a vertical projection of the first light-shielding structure on the underlying substrate has an overlapped region with a vertical projection of the second light-shielding structure on the underlying substrate.

2. A display device, comprising a color filter substrate, the color filter substrate comprising an underlying substrate, a first light-shielding structure disposed on a first surface of the underlying substrate, and an electrically conductive transparent layer configured for transferring electrostatic charge, the electrically conductive transparent layer being disposed on a second surface of the underlying substrate opposite to the first surface, the color filter substrate being divided into a displaying region and a non-displaying region, the underlying substrate comprising a displaying portion located in the displaying region and a non-displaying portion located in the non-displaying region, wherein
   an outer edge of the first light-shielding structure is spaced apart by a first distance from an outer edge of the non-displaying portion of the underlying substrate;
   the color filter substrate further comprises a second light-shielding structure located in the non-displaying region and between the underlying substrate and the electrically conductive transparent layer, an outer edge of the second light-shielding structure being aligned with the outer edge of the non-displaying portion of the underlying substrate;
   a vertical projection of the non-displaying portion of the underlying substrate on a first plane is entirely covered by a combination of a vertical projection of the first light-shielding structure on the first plane and a vertical projection of the second light-shielding structure on the first plane, the first plane being a plane perpendicular to a propagation direction of light emitted toward the non-displaying region of the color filter substrate; and an inner edge of the second light-shielding structure is spaced apart by a second distance from an interface between the non-displaying region and the displaying region, the first light-shielding structure is located in both the non-displaying region and in the displaying region, and a vertical projection of the first light-shielding structure on the underlying substrate has an overlapped region with a vertical projection of the second light-shielding structure on the underlying substrate.

3. The color filter substrate according to claim 1, wherein a width of the overlapped region is larger than or equal to 0.8 mm.

4. The color filter substrate according to claim 1, wherein the first distance is larger than or equal to 0.2 mm.

5. The color filter substrate according to claim 1, wherein a material of the second light-shielding structure is the same as that of the first light-shielding structure.

6. The color filter substrate according to claim 1, wherein the first light-shielding structure is a black matrix.

7. The display device according to claim 2, wherein a width of the overlapped region is larger than or equal to 0.8 mm.

8. The display device according to claim 2, wherein the first distance is larger than or equal to 0.2 mm.

9. The display device according to claim 2, wherein a material of the second light-shielding structure is the same as that of the first light-shielding structure.

10. The display device according to claim 2, wherein the first light-shielding structure is a black matrix.

11. The color filter substrate according to claim 6, wherein the black matrix is located between adjacent pixels or subpixels of the color filter substrate.

12. The display device according to claim 10, wherein the black matrix is located between adjacent pixels or subpixels of the color filter substrate.

* * * * *